United States Patent
Mountanos

(10) Patent No.: US 9,912,746 B2
(45) Date of Patent: Mar. 6, 2018

(54) CONTENT DISTRIBUTION SYSTEM

(71) Applicant: Microsoft Technology Licensing, LLC, Redmond, WA (US)

(72) Inventor: Peter Mountanos, Redwood City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/258,735

(22) Filed: Sep. 7, 2016

(65) Prior Publication Data

US 2016/0381131 A1  Dec. 29, 2016

Related U.S. Application Data

(63) Continuation of application No. 12/941,712, filed on Nov. 8, 2010, now Pat. No. 9,444,876.

(51) Int. Cl.
| | |
|---|---|
| G06F 15/16 | (2006.01) |
| H04L 29/08 | (2006.01) |
| H04W 76/02 | (2009.01) |
| H04W 84/18 | (2009.01) |

(52) U.S. Cl.
CPC ............ *H04L 67/108* (2013.01); *H04L 67/06* (2013.01); *H04L 67/1091* (2013.01); *H04W 76/021* (2013.01); *H04W 84/18* (2013.01)

(58) Field of Classification Search
CPC .................................................. H04L 67/108
See application file for complete search history.

(56) References Cited

U.S. PATENT DOCUMENTS

| | | | |
|---|---|---|---|
| 7,376,716 B2 | 5/2008 | Dilley et al. | |
| 7,733,808 B2 | 6/2010 | Hu et al. | |
| 8,064,894 B1* | 11/2011 | Bill | G06Q 10/10 370/395.3 |
| 2003/0028519 A1 | 2/2003 | Burgess | |
| 2003/0033286 A1 | 2/2003 | Burgess | |
| 2003/0204602 A1* | 10/2003 | Hudson | D01D 5/423 709/228 |
| 2006/0007947 A1 | 1/2006 | Li et al. | |
| 2007/0220417 A1* | 9/2007 | Mathew | G06F 17/3089 715/234 |

(Continued)

FOREIGN PATENT DOCUMENTS

CN   101023627 A   8/2007

OTHER PUBLICATIONS

Hefeeda, M. et al., "A hybrid architecture for cost-effective on-demand media streaming," Computer Networks: The International Journal of Computer and Telecommunications Networking, vol. 44, No. 3, Feb. 2004, 30 pages.

(Continued)

*Primary Examiner* — Hieu Hoang
(74) *Attorney, Agent, or Firm* — Alleman Hall Creasman & Tuttle LLP

(57) ABSTRACT

Network delivery of digital content decreases bandwidth requirements at a source and facilitates the transfer of digital content to consumers from one or more sources. The digital content includes an identifier that permits the digital content to be recognized even when distributed to more than one source.

20 Claims, 6 Drawing Sheets

(56) References Cited

U.S. PATENT DOCUMENTS

| | | | | |
|---|---|---|---|---|
| 2007/0294422 | A1* | 12/2007 | Zuckerman | G06F 17/30206 709/230 |
| 2008/0133767 | A1 | 6/2008 | Birrer et al. | |
| 2008/0140853 | A1 | 6/2008 | Harrison | |
| 2008/0155061 | A1 | 6/2008 | Afergan et al. | |
| 2008/0192752 | A1* | 8/2008 | Hyslop | H04W 74/06 370/395.21 |
| 2009/0024754 | A1 | 1/2009 | Setton et al. | |
| 2009/0282105 | A1 | 11/2009 | Kamiya | |
| 2010/0094959 | A1* | 4/2010 | Zuckerman | H04L 67/1002 709/219 |
| 2010/0100911 | A1 | 4/2010 | Ramakrishnan et al. | |
| 2010/0146569 | A1* | 6/2010 | Janardhan | H04N 7/17318 725/98 |
| 2010/0262714 | A1* | 10/2010 | Hiie | H04L 65/4007 709/234 |
| 2011/0072075 | A1* | 3/2011 | Gautier | H04L 12/1881 709/203 |
| 2011/0087733 | A1* | 4/2011 | Shribman | H04L 41/046 709/204 |
| 2011/0173265 | A1 | 7/2011 | Liang et al. | |
| 2011/0225312 | A1* | 9/2011 | Liu | H04L 12/18 709/231 |
| 2012/0096121 | A1* | 4/2012 | Hao | H04L 67/2842 709/219 |

OTHER PUBLICATIONS

Li, J. et al., "Mutualcast: An Efficient Mechanism for One-To-Many Content Distribution," Proceedings of ACM Sigcomm Asia '04, Apr. 10, 2004, Beijing, China, 10 pages.

Zhou, M. et al., "A Hybrid Overlay Network for Video-on-Demand," Proceedings of the 2005 IEEE International Conference on Communications (ICC 2005), May 16, 2005, Seoul, Korea, 5 pages.

Magharei, N. et al., "PRIME: Peer-to-Peer Receiver-driven MEsh-based Streaming," IEEE/ACM Transactions on Networking, vol. 17, No. 4, Aug. 2009, 9 pages.

United States Patent and Trademark Office, Office Action Issued in U.S. Appl. No. 12/941,712, dated Oct. 18, 2013, 13 pages.

State Intellectual Property Office of the People's Republic of China, First Office Action Issued in Application No. 201110379534.6, dated Dec. 10, 2013, 15 pages.

United States Patent and Trademark Office, Office Action Issued in U.S. Appl. No. 12/941,712, dated Mar. 4, 2014, 13 pages.

State Intellectual Property Office of the People's Republic of China, Second Office Action Issued in Application No. 201110379534.6, dated Aug. 27, 2014, 15 pages. (Submitted with English Summary and Translation).

United States Patent and Trademark Office, Office Action Issued in U.S. Appl. No. 12/941,712, dated Dec. 5, 2014, 14 pages.

United States Patent and Trademark Office, Notice of Allowance Issued in U.S. Appl. No. 12/941,712, dated Apr. 23, 2015, 11 pages.

United States Patent and Trademark Office, Office Action Issued in U.S. Appl. No. 12/941,712, dated Sep. 1, 2015, 10 pages.

United States Patent and Trademark Office, Office Action Issued in U.S. Appl. No. 12/941,712, dated Jan. 12, 2016, 12 pages.

United States Patent and Trademark Office, Notice of Allowance Issued in U.S. Appl. No. 12/941,712, dated May 19, 2016, 8 pages.

\* cited by examiner

CONTENT DISTRIBUTION SYSTEM

CROSS REFERENCE TO RELATED APPLICATIONS

This application is a continuation of U.S. patent application Ser. No. 12/941,712, filed on Nov. 8, 2010, and titled "CONTENT DISTRIBUTION SYSTEM", the entire disclosure of which is hereby incorporated herein by reference.

BACKGROUND

As consumer demand for digital content increases, digital content providers strive to meet that demand. One approach for meeting the demand includes increasing network bandwidth of the content providers to directly handle more content delivery. However, such bandwidth is expensive for the digital content providers.

SUMMARY

Network delivery of digital content decreases bandwidth requirements at a source and facilitates the transfer of digital content to consumers from one or more sources. The digital content includes an identifier that permits the digital content to be recognized even when distributed to more than one source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following disclosure is directed to a content distribution system for delivering digital content items to content consumers via a network, such as the Internet. Virtually any type of digital content can be delivered, including, but not limited to, video, audio, games, applications, and documents. As described in detail below, the content distribution system is configured so that peer content consumers may download digital content from one another using peer-to-peer sharing if the desired content is available via a peer-to-peer network. If the content is not available via the peer to peer network, a content consumer may automatically retrieve the content from a source server. Once content is acquired from a source server in this manner, it may then be made available via the peer-to-peer network so that other peers can download the digital content without going to the source server. The content distribution system may therefore allow peers to interact with more than one content source server in addition to interacting with other peers. The system may be configured to support more than one content item delivery protocol. In this way, content can be widely distributed and bandwidth requirements can be lessened at the source server.

Figure 1:
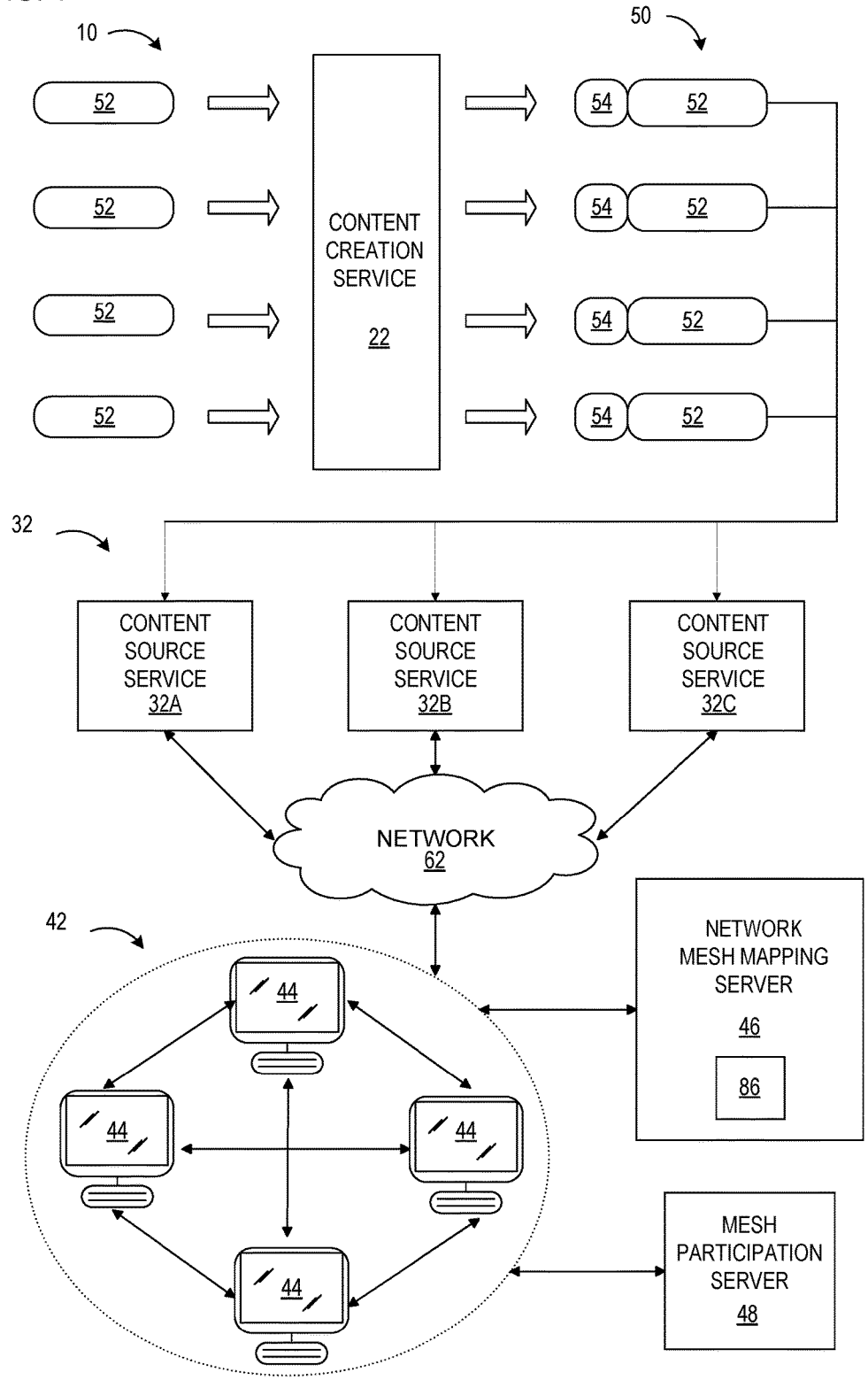
FIG. 1 schematically shows an example content distribution system.

FIG. 1 schematically shows a content distribution system 10 comprising a content creation service 22, one or more different content source services 32 (e.g. content source service 32A, content source service 32B, and content source service 32C), and a network mesh 42 comprising one or more peer devices 44. In some embodiments, a content distribution system may further include a network mesh mapping server 46 and/or a mesh participation server 48.

Content creation service 22 is configured to create a content item 50 and distribute the content item 50 to one or more different content source services 32, which in turn may distribute content item 50 to one or more peer devices 44. Once content item 50 is distributed to a peer device 44, it may then be distributed peer-to-peer among the various peer devices 44. In this way, content item 50 can be downloaded to many different peer devices without taxing the bandwidth of content creation service 22 and/or content source services 32.

Content item 50 is available to consumers who wish to receive content item 50 through content distribution system 10. Content item 50 may include video, audio, games, applications, documents, or virtually any other digital content. Content item 50 includes content data 52 and a unique content identifier 54 which may be assigned by content creation service 22. Once content item 50 is created, it is available for distribution and each content item 50 includes content data 52 and unique content identifier 54.

Content data 52 serves as the digital payload of content item 50. As non-limiting examples, content data 52 may include audio data, video data, application data, game data, widget data, and/or other digital payloads. The content data may be in any suitable format. As a nonlimiting example, a content item 50 that includes an audio component may include data formatted as an mp3, mp4, wav or aiff file. In some embodiments, content data 52 may include a multimedia container.

Unique content identifier 54 serves as an identifier that can be used to differentiate one content item from other content items. Unique content identifier 54 may be assigned to content item 50 by content creation service 22 at the conception of content item 50, thereby creating a virtual fingerprint of content item 50. Unique content identifier 54 is a permanent identification, remaining the same regardless of which content source service 32 acquires content item 50 from content creation service 22. In another example, unique content identifier 54 may be assigned upstream or downstream of content creation service 22. For example, unique content identifier 54 may be assigned by content source server 32. If two content items include different content data, then the two content items will have different unique content identifiers. Likewise, if two content items include the same content data, then the two content items will have the same unique content identifier. For example, content item 50 may be encoded by more than one video on demand provider (e.g. content source servers 32), yet if the content data is the same then the content items will have the same unique content identifier.

Unique content identifier 54 may be a globally unique identification (GUID), or any other numerical, alphabetical, symbolic character-based, and/or other data representable identification that is unique at least within the scope of a given set of peers. Unique content identifier 54 may be in the form of a randomly generated number that is 128 bits or larger, as one example. In some embodiments, for example within a limited peer mesh, a 64 bit or smaller identifier may suffice. In some embodiments, unique content identifier 54 may be expressed as a hexadecimal character string and may be thirty two characters or longer. The randomly generated number may be generated in any suitable manner that produces a unique identifier. As one nonlimiting example, a coordinated universal time stamp (UTC) from the time of number generation may form the base of the randomly generated number, and this stamp may be augmented by a random ID (UTC+ID) generated using a random number algorithm. Alternatively, unique content identifier 54 may be acquired from a list of previously unused identifiers. In such cases, a network accessible service may be used to maintain the list of previously unused identifiers.

One or more content source services 32 may acquire content item 50 from content creation service 22. A content source service 32 may be virtually any content item provider that is available to digital content consumers via a network 62. Further, a content source service 32 may be virtually any provider that obtains the legal rights to possess and/or use content item 50 as well as the legal rights to distribute or share content item 50 with digital content consumers. Content source services 32 are configured to distribute content item 50 to peer devices 44 participating in a network mesh 42 via a network 62. For example, a network 62 may include the Internet, an intranet or virtually any other digital community infrastructure.

Peer device 44 may include a personal computer, a personal digital assistant (PDA), a media playback device, a mobile phone or virtually any other device configured to receive content item 50 from content source service 32 and/or from another peer device 44. As described in more detail below, each peer device 44 may take the form of a computing device including a logic subsystem and/or a data-holding subsystem. The data-holding subsystem may be operatively connected to the logic subsystem and may hold instructions executable by the logic subsystem to send a message to inquire about the availability of content item 50. The data-holding subsystem instructions may optionally be a component of an operating system of each peer device 44.

Peer device 44 may include software that may support more than one content item delivery protocol. For example, delivery protocols such as HTTP, UDP, and SSTP, may be included in the software package and are provided as nonlimiting examples. As such, a single piece of content may be delivered to a client machine from multiple peers using different protocols per peer. Further, the software package may enable a peer device to download a content item via one delivery protocol and send a content item via another delivery protocol. For example, a first peer device may be downloading a content item via a HTTP protocol while a second peer device may be downloading a content item from the first peer device via a UDP protocol.

A network mesh 42 includes two or more peer devices 44. The network mesh is configured so that peers are able to query each other via a broadcast message and get a status response that can be locally cached. The status response from each peer in the mesh may be saved until the status response is updated or a new query results in a different status response. In this way, each peer in a network mesh may dynamically monitor the network mesh.

It will be appreciated that one or more network meshes may exist. Moreover, in some cases, a peer device may be a participant in more than one network mesh. Network mesh 42 may optionally be organized by and may further include, a mesh participation server 48 and a network mesh mapping server 46. When included, mesh participation server 48 may be configured to direct a new participant (e.g., a peer device) to network mesh 42. Mesh participation server 48 may direct a new participant to a particular network mesh 42 in response to a request for content item 50 made by the new participant. As such, each network mesh 42 may be associated with a mesh mapping server 46 that the mesh participation server 48 may consult in order to identify a new participant to a particular network mesh.

When included, mesh mapping server 46 may be configured to maintain a catalog, for example a mesh map 86, of content items 50 available on each of the two or more peer devices 44 within network mesh 42. Mesh map 86 may be queried by a digital content consumer with a peer device 44 such that the digital content consumer may search for a specific content item 50 and check for the availability of that specific content item 50 within network mesh 42. A digital content consumer may identify a specific content item 50 by its particular unique content identifier 54. Further, mesh map 86 may be updated each time a peer device 44 within network mesh 42 acquires a new content item 50. Mesh map 86 may be updated automatically, and/or mesh map 86 may be updated responsive to a command from a digital content consumer.

In some embodiments, a peer device 44 may serve as a mesh participation server 48 and/or a network mapping server 46.

When a specific content item 50, or portion thereof, is identified as being available on a peer device in network mesh 42, the peer device 44 may download the specific content item 50. When the desired content item 50, or portion thereof, is unavailable in network mesh 42, the peer device 44 may download the desired content item 50 from one or more content source services 32.

A content item 50 may be downloaded from one or more peer devices 44 and/or one or more content source services 32. For example, different portions of content item 50 may be downloaded from different peer devices 44 and/or content source services 32, where two or more portions constitute the whole content item 50. By downloading content item 50 as portions, the source server bandwidth may be decreased and/or the download time to acquire content item 50 may be decreased as opposed to downloading content item 50 from one source (peer device or content source service) without dividing content item 50 into portions. Additionally, each peer device 44 may be configured with a content restriction feature that prevents the peer device from sharing unauthorized content via the network mesh 42. In other words, peer devices can be configured to ensure that content items 50 that are available within network mesh 42 have originated from a content creation service 22. Further, content items 50 available within network mesh 42 may be protected by one or more digital rights management solution.

Figure 2:
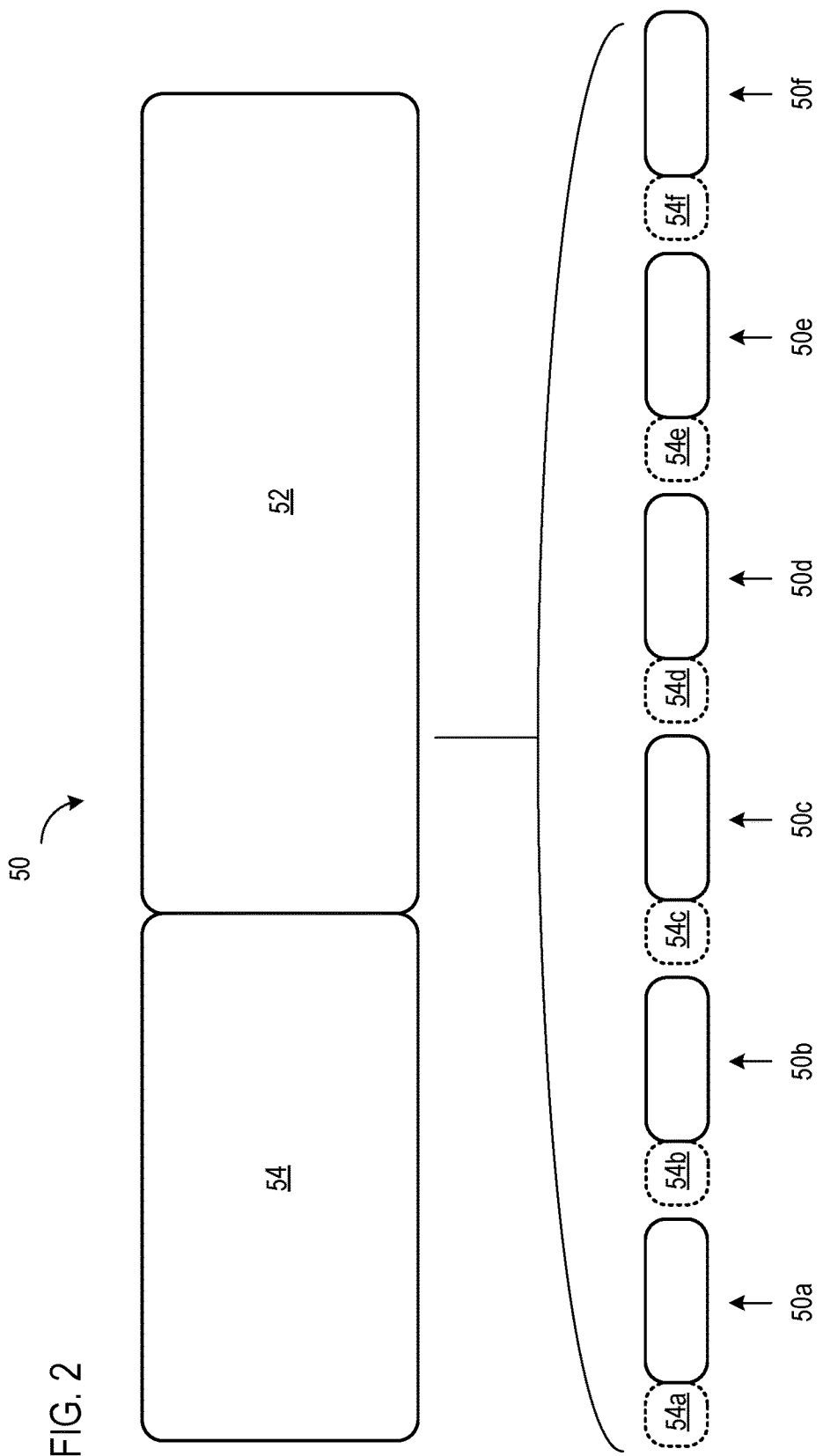
FIG. 2 schematically shows example content items that can be distributed by the content distribution system of FIG. 1.

FIG. 2 schematically shows content item 50. Content item 50 includes content data 52 and unique content identifier 54. As described above, content data 52 may include the payload and unique content identifier 54 may serve as an indicator to accurately identify the payload.

In some cases, content data 52 may include two or more separable portions. In the depicted example, content data 52 includes portions 50a-50f. Each portion may optionally be packaged with a content identifier 54, which may optionally include, as a supplement to the identifier that identifies the payload as a whole, an identifier that further identifies that particular portion (e.g., content identifiers 54a-54f). As another example, each portion may have a separate unique identifier.

Any or all of portions 50a-50f of content item 50 may be available for download to one or more peer devices 44 participating in network mesh 42 and/or portions 50a-50f may be available for download to one or more peer devices 44 from one or more content source services 32. In other words, when downloading a particular content item, a peer device may receive different portions of the content item from different entities. Content item 50 may be downloaded as separate portions 50a-50f in parallel and/or series. Portions 50a-50f collectively constitute content data 52 and may be reassembled during and/or after downloading. While six portions are used in the illustrated example, it is to be understood that content data may be parsed into any number of portions according to a variety of different constraints. In some examples, each portion may be the same size, while in other embodiments some portions may be sized differently than other portions. In either case, each portion may be packaged with a self-identifying element that self reports the size of that portion. Such a self-identifying element may optionally be incorporated into a content identifier in some embodiments.

Content item 50 may be an archived digital file or a real-time file such as a live digital stream. In other words, the content item may be completed prior to the beginning of downloading (e.g., a rerun television program) or the content item may be in progress while downloading (e.g., a live television program). In the case of a real-time file such as a live digital file, a downloading peer device may establish redundant downloading partners so that if a download is interrupted from one partner, the interruption can be compensated for by downloading the interrupted content from a redundant partner. In this way, presentation of the live digital file need not be delayed due to an interruption from a single downloading partner. It will be appreciated that a plurality of peer devices 44 and/or a plurality of content source services 32 may facilitate the distribution of a live digital stream.

Figure 3:
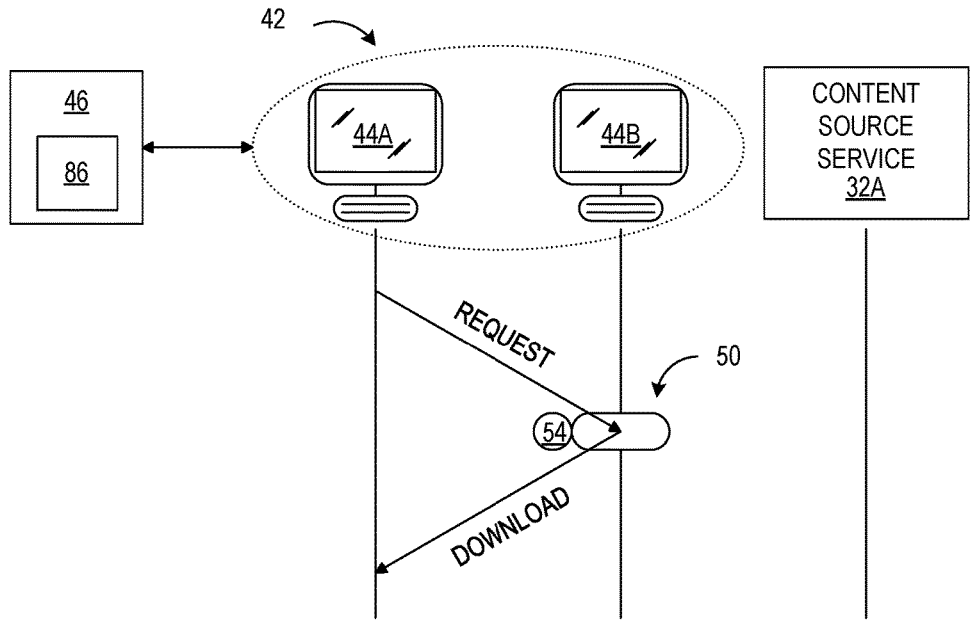
FIG. 3 illustrates an example scenario for downloading a content item.

Example scenarios for acquiring content item 50 are discussed with greater detail with reference to FIGS. 3, 4, 5, and 6. FIG. 3 is a schematic diagram showing an example scenario where content item 50 is available for download within network mesh 42. In FIG. 3, peer device 44A queries mesh map 86 of network mesh mapping server 46 for a desired content item 50 with specific unique content identifier 54. The network mesh mapping server 46 responds to the query by sending the location of desired content item 50 to peer device 44A. In particular, desired content item 50 is stored within a storage device of peer device 44B. Peer device 44A requests to download content item 50 from peer device 44B. In response to receiving the request, peer device 44B sends content item 50 to peer device 44A. While this example describes downloading content item 50 from one peer device 44B, it will be appreciated that content item 50 may be downloaded from more than one peer device in network mesh 42, and further, content item 50 may be downloaded as one or more portions, as described above.

Figure 4:
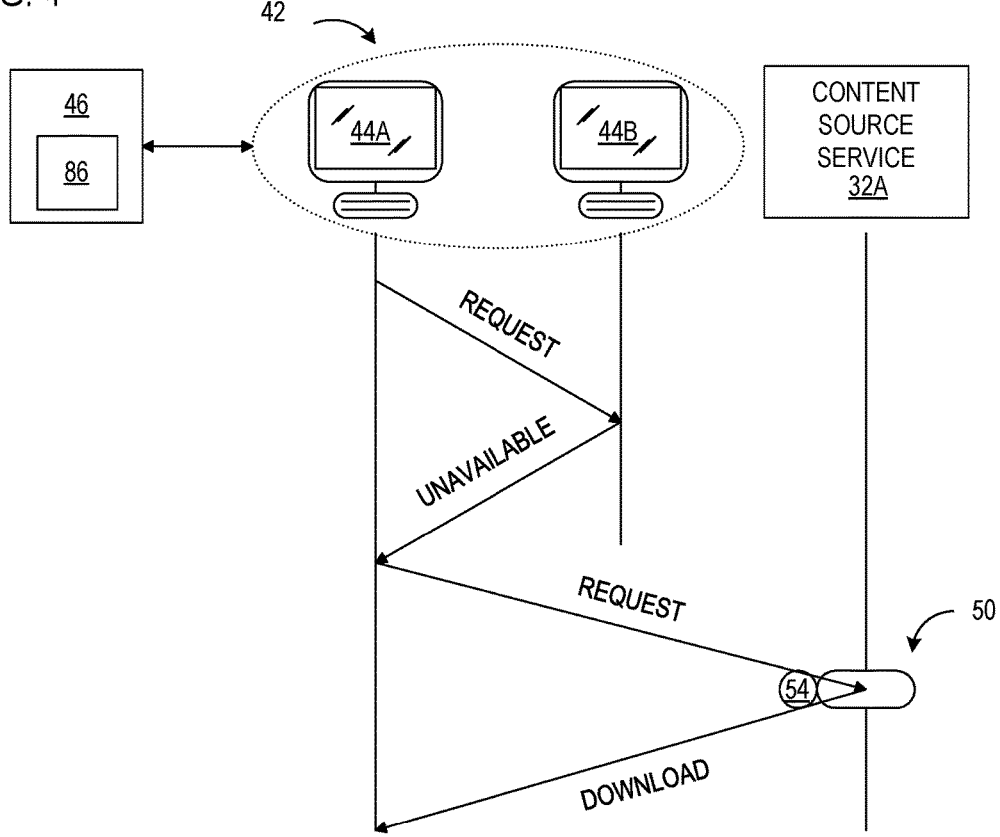
FIG. 4 illustrates another example scenario for downloading a content item.

In FIG. 4, peer device 44A queries mesh map 86 of network mesh mapping server 46 for a desired content item 50 with specific unique content identifier 54. The network mesh mapping server 46 responds to the query by sending a message to peer device 44A that desired content item 50 is unavailable within network mesh 42. After learning that content item 50 is unavailable within network mesh 42, peer device 44A sends a request to download desired content item 50 from content source service 32A. In response to receiving the request, content source service 32A sends content item 50 to peer device 44A within network mesh 42. While this example describes downloading content item 50 from one content source service 32A, it will be appreciated that content item 50 may be downloaded from more than one content source service 32A, and further, content item 50 may be downloaded as one or more portions, as described above.

Figure 5:
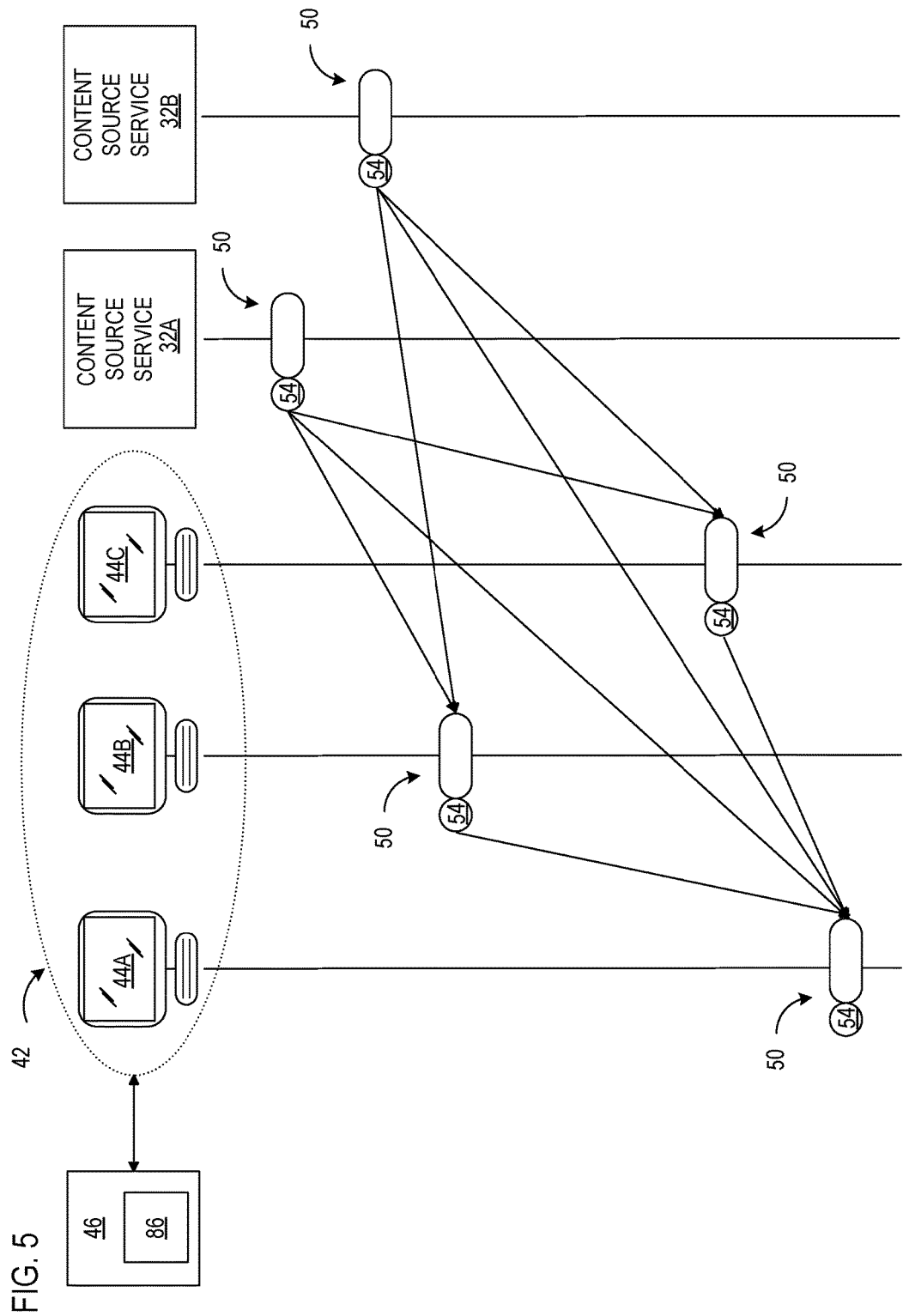
FIG. 5 illustrates another example scenario for downloading a content item.

FIG. 5 is another schematic diagram showing an example scenario where content item 50 is available for download within network mesh 42 from more than one peer device and is also available for download from more than one content source service. To illustrate this scenario, FIG. 5 is shown in simplified form, by representing downloading pathways with arrows and not displaying requesting pathways. In this example, peer device 44A may be receiving content item 50 as portions, where different portions of content item 50 may be downloaded from peer device 44B, peer device 44C, content source service 32A, and content source service 32B. Further, peer device 44B and peer device 44C downloaded content item 50 from both of content source service 32A and content source service 32B. While this example describes downloading content item 50 from two peer devices and two content source services, it will be appreciated that content item 50 may be downloaded from more than two peer devices in network mesh 42, and/or more than two content source services. Likewise, content item 50 may be downloaded from fewer peer devices and/or fewer content source services as one or more portions of content item 50.

Figure 6:
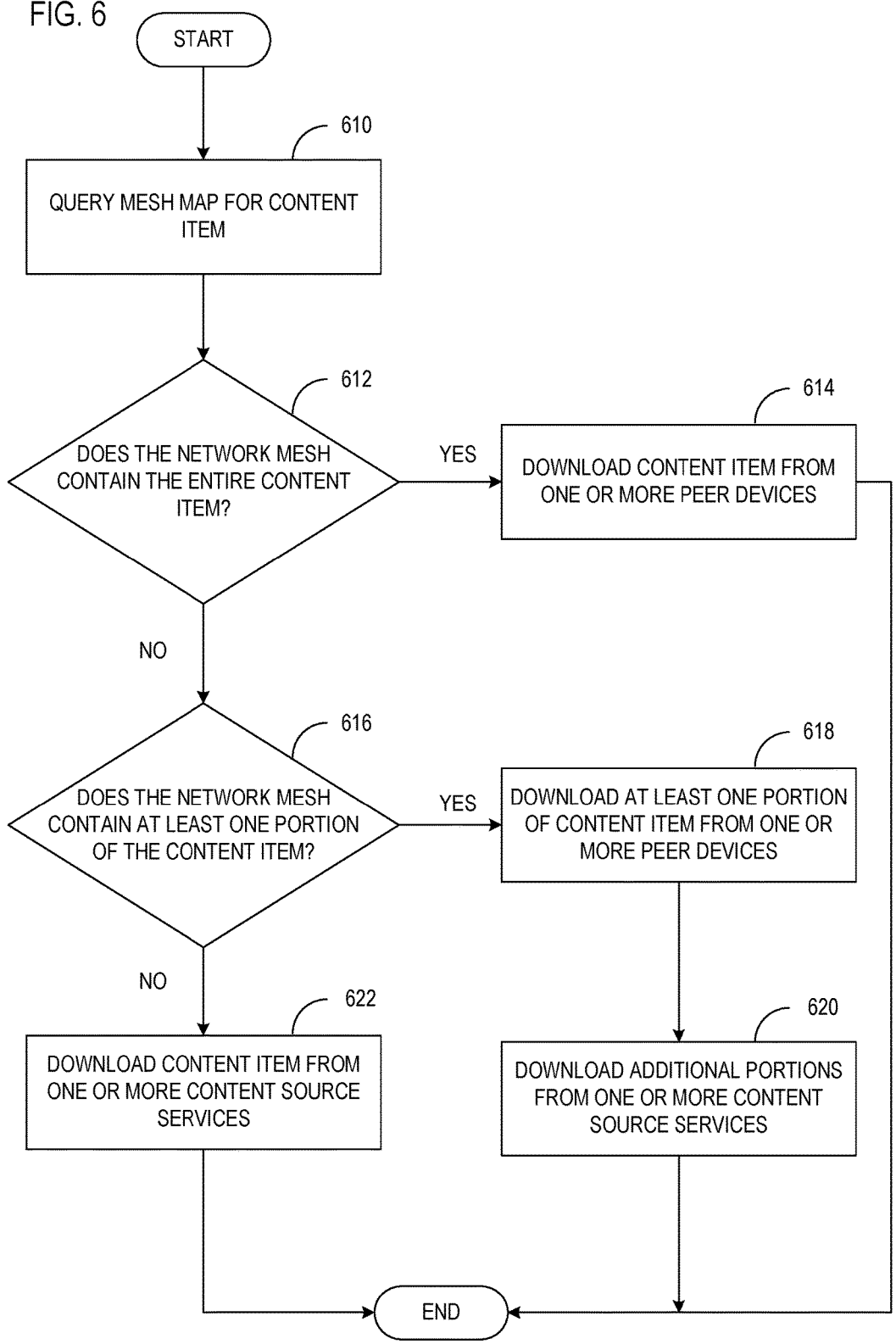
FIG. 6 illustrates an example method for downloading a content item.

FIG. 6 shows an example method for acquiring a desired content item. As one example, the method may be performed by peer device 44 of FIG. 1. At 610, the method includes querying a mesh map of a network mesh for a desired content item.

At 612, the method includes determining if the network mesh contains the entire desired content item. If it is determined that the network mesh contains the entire desired content item, the method moves to 614. Otherwise, the method moves to 616.

At 614, the method includes downloading or receiving the desired content item from one or more peer devices.

At 616, the method includes determining if the network mesh contains at least one portion of the desired content item. If it is determined that the network mesh contains at least one portion, the method moves to 618. Otherwise, the method moves to 622.

At 618, the method includes downloading at least one portion of the desired content item from one or more peer devices within the network mesh. The method then moves to 620 and includes downloading the additional portions of the desired content item from one or more content source services. In some embodiments, download constraints may be implemented to improve startup response and/or reduce playback delays. For example, constraints may be used to ensure that content portions are downloaded in order and/or when needed. For example, if only the second half of a file is available in the mesh, it may delay playback to get the second half of the file before getting the first half from the content source services. As such, in some embodiments, steps 618 and 620 may be executed in parallel or reverse order.

At 622, the method includes downloading the desired content item from one or more content source services.

By downloading some or all of a desired content item from one or more peer devices in a network mesh, bandwidth is distributed among the peer devices rather than the entire burden of digital content sharing being funneled through the content source services.

In some embodiments, the above described methods and processes may be tied to a computing system including one or more computers. In particular, the methods and processes described herein may be implemented as a computer application, computer service, computer API, computer library, and/or other computer program product. Such methods and processes may be executed by one or more computing systems configured to serve as one of the devices, services, and/or servers introduced above (e.g., peer device 44, content source service 32, content creation service 22, network mesh mapping server 46, and mesh participation server 48).

Figure 7:
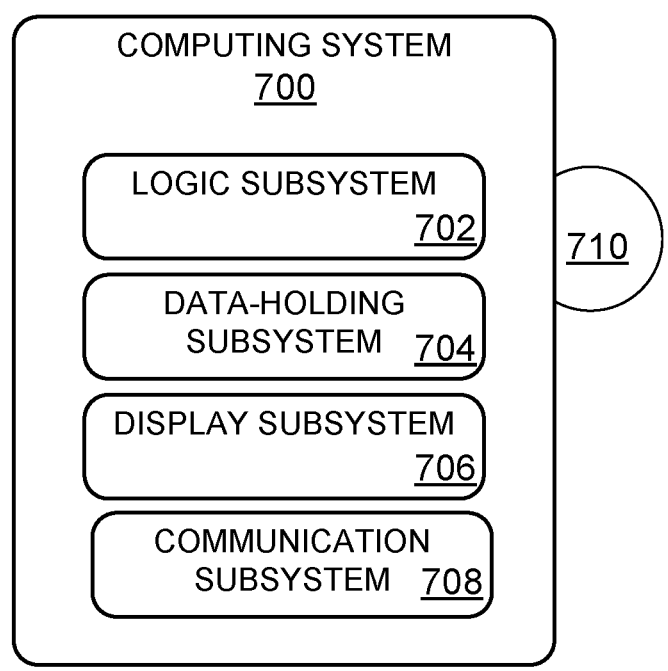
FIG. 7 schematically shows a computing system in accordance with various embodiments of the present disclosure.

FIG. 7 schematically shows a nonlimiting computing system 700 that may perform one or more of the above described methods and processes. Computing system 700 is shown in simplified form. It is to be understood that virtually any computer architecture may be used without departing from the scope of this disclosure. In different embodiments, computing system 700 may take the form of a mainframe computer, server computer, desktop computer, laptop computer, tablet computer, home entertainment computer, network computing device, mobile computing device, mobile communication device, gaming device, etc. Further, as introduced above, any of peer device 44, content source service 32, content creation service 22, network mesh mapping server 46, and mesh participation server 48 may be configured in accordance with the description of computing system 700.

Computing system 700 includes a logic subsystem 702 and a data-holding subsystem 704. Computing system 700 may optionally include a display subsystem 706, communication subsystem 708, and/or other components not shown in FIG. 7. Computing system 700 may also optionally include user input devices such as keyboards, mice, game controllers, cameras, microphones, and/or touch screens, for example.

Logic subsystem 702 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 702 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 704 may include one or more physical, non-transitory, devices configured to hold data and/or instructions executable by the logic subsystem to implement the herein described methods and processes. When such methods and processes are implemented, the state of data-holding subsystem 704 may be transformed (e.g., to hold different data).

Data-holding subsystem 704 may include removable media and/or built-in devices. Data-holding subsystem 704 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 704 may include devices with one or more of the following characteristics: volatile, nonvolatile, dynamic, static, read/write, read-only, random access, sequential access, location addressable, file addressable, and content addressable. In some embodiments, logic subsystem 702 and data-holding subsystem 704 may be integrated into one or more common devices, such as an application specific integrated circuit or a system on a chip.

FIG. 7 also shows an aspect of the data-holding subsystem in the form of removable computer-readable storage media 710, which may be used to store and/or transfer data and/or instructions executable to implement the herein described methods and processes. Removable computer-readable storage media 710 may take the form of CDs, DVDs, HD-DVDs, Blu-Ray Discs, EEPROMs, and/or floppy disks, among others.

The terms "module," "program," and "engine" may be used to describe an aspect of computing system 700 that is implemented to perform one or more particular functions. In some cases, such a module, program, or engine may be instantiated via logic subsystem 702 executing instructions held by data-holding subsystem 704. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 706 may be used to present a visual representation of data held by data-holding subsystem 704. As the herein described methods and processes change the data held by the data-holding subsystem, and thus transform the state of the data-holding subsystem, the state of display subsystem 706 may likewise be transformed to visually represent changes in the underlying data. Display subsystem 706 may include one or more display devices utilizing virtually any type of technology. Such display devices may be combined with logic subsystem 702 and/or data-holding subsystem 704 in a shared enclosure, or such display devices may be peripheral display devices.

When included, communication subsystem 708 may be configured to communicatively couple computing system 700 with one or more other computing devices. Communication subsystem 708 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
a logic device; and
a data-holding device operatively connected to the logic device and holding instructions executable by the logic device to:
maintain a mesh map of a plurality of content items available for transfer on each of two or more peer devices participating in a network mesh, each content item of the plurality of content items having a plurality of portions of content data each having a particular unique content identifier that differentiates that portion from any other portion of any content item having different content data such that two portions having the same content data that are encoded differently by two different content source services have the same unique content identifier;
receive from a peer device participating in the network mesh a message including a unique content identifier of a newly acquired portion of a content item;
if the unique content identifier of the newly acquired portion matches a unique content identifier of any existing portion in the mesh map, update the mesh map to indicate that the peer device has acquired the portion of the content item corresponding to the unique content identifier; and
if the unique content identifier of the newly acquired portion does not match a unique content identifier of any existing portion in the mesh map, update the mesh map to include the newly acquired portion of the content item, the unique content identifier associated with the newly acquired portion, and indicate that the peer device has acquired the newly acquired portion of the content item.

2. The computing device of claim 1, wherein the mesh map includes a plurality of content items available for transfer from a content source service.

3. The computing device of claim 1, wherein the instructions are executable to receive a request message from a peer device asking if portions of a desired content item are available for transfer.

4. The computing device of claim 3, wherein the instructions are executable to send a response message to the peer device indicating a source the mesh map identifies as including the portions of the desired content item.

5. The computing device of claim 4, wherein the response message indicates a peer source if the mesh map indicates a peer device includes the portions of the desired content item.

6. The computing device of claim 4, wherein the response message indicates a content source service if the mesh map indicates a peer device does not include the portions of the desired content item.

7. The computing device of claim 1, wherein one or more of the peer devices are gaming devices.

8. The computing device of claim 7, wherein one or more of the plurality of content items are games playable by the gaming devices.

9. The computing device of claim 1, wherein one or more of the peer devices are home entertainment computers.

10. The computing device of claim 9, wherein one or more of the plurality of content items include video playable by the home entertainment computers.

11. The computing device of claim 9, wherein one or more of the plurality of content items include audio playable by the home entertainment computers.

12. The computing device of claim 1, wherein one or more of the peer devices are mobile phones.

13. The computing device of claim 12, wherein one or more of the plurality of content items include applications executable by the mobile phones.

14. A method, comprising:
maintaining a mesh map of a plurality of content items available for transfer on each of two or more peer devices participating in a network mesh, each content item of the plurality of content items having a plurality of portions of content data each having a particular unique content identifier that differentiates that portion from any other portion of any content item having different content data such that two portions having the same content data that are encoded differently by two different content source services have the same unique content identifier;
receiving from a peer device participating in the network mesh a message including a unique content identifier of a newly acquired portion of a content item;
if the unique content identifier of the newly acquired portion matches a unique content identifier of any existing portion in the mesh map, updating the mesh map to indicate that the peer device has acquired the portion of the content item corresponding to the unique content identifier; and
if the unique content identifier of the newly acquired portion does not match a unique content identifier of any existing portion in the mesh map, updating the mesh map to include the newly acquired portion of the content item, the unique content identifier associated with the newly acquired portion, and indicate that the peer device has acquired the newly acquired portion of the content item.

15. The method of claim 14, wherein the mesh map includes a plurality of content items available for transfer from a content source service.

16. The method of claim 14, further comprising receiving a request message from a peer device asking if portions of a desired content item are available for transfer.

17. The method of claim 16, further comprising sending a response message to the peer device indicating a source the mesh map identifies as including the portions of the desired content item.

18. The method of claim 17, wherein the response message indicates a peer source if the mesh map indicates a peer device includes the portions of the desired content item.

19. The method of claim 17, wherein the response message indicates a content source service if the mesh map indicates a peer device does not include the portions of the desired content item.

20. A game service computing device, comprising:
a logic device; and
a data-holding device operatively connected to the logic device and holding instructions executable by the logic device to:
maintain a mesh map of a plurality of games available for transfer on each of two or more peer gaming devices participating in a network mesh, each game of the plurality of games having a plurality of portions of game data each having a particular unique content identifier that differentiates that portion from any other portion of any game having different content data such that two portions having the same content data that are encoded differently by two different game services have the same unique content identifier;
receive from a peer gaming device participating in the network mesh a message including a unique content identifier of a newly acquired portion of a game;
if the unique content identifier of the newly acquired portion matches a unique content identifier of any existing portion in the mesh map, update the mesh map to indicate that the peer gaming device has acquired the portion of the game corresponding to the unique content identifier; and
if the unique content identifier of the newly acquired portion does not match a unique content identifier of any existing portion in the mesh map, update the mesh map to include the newly acquired portion of the game, the unique content identifier associated with the newly acquired portion, and indicate that the peer gaming device has acquired the newly acquired portion of the game.

* * * * *